United States Patent [19]

Arfsten

[11] Patent Number: 4,520,713
[45] Date of Patent: Jun. 4, 1985

[54] ROOF VENTILATOR

[76] Inventor: Richard Arfsten, 3031 Sheard Rd., Burlington, Wis. 53105

[21] Appl. No.: 478,487

[22] Filed: Mar. 24, 1983

[51] Int. Cl.³ .............................................. F24F 7/02
[52] U.S. Cl. ................................... 98/42.19; 98/42.22
[58] Field of Search .................. 98/42 R, 42 A, 43 C, 98/55

[56] References Cited

U.S. PATENT DOCUMENTS

| | | | |
|---|---|---|---|
| 2,423,739 | 7/1947 | Tillman | 98/42 R |
| 2,490,220 | 12/1949 | Leslie | 98/42 R |
| 2,685,247 | 8/1954 | Bell, Jr. | 98/42 A |
| 2,741,972 | 4/1956 | Pryne | 98/42 R X |
| 4,090,435 | 5/1978 | Vallée | 98/42 R X |
| 4,109,433 | 8/1978 | Maze | 98/42 A X |

FOREIGN PATENT DOCUMENTS 66838 12/1982 European Pat. Off. ............ 98/42 A

Primary Examiner—Harold Joyce
Attorney, Agent, or Firm—Andrus, Sceales, Starke & Sawall

[57] ABSTRACT

A ventilator for mounting on a sloping roof has a pair of trapezoidal side members. The uphill ends of the side members are less slanted than the lower ends. Covering members extend between the side members to define an opening along the upper bases of the side members through which air may exit from a hole in the roof of the building.

11 Claims, 4 Drawing Figures

ROOF VENTILATOR

Buildings, such as farm buildings often contain moist air due to the present of animals, such as cattle and hogs, and for other reasons. Unless removed, the moist air will condense, as on the roof of the building. This often leads to damage to the building or its contents, or possible harm to the animals.

The present invention is directed to an improved roof vent for ventilating buildings, including, but not limited to, agricultural buildings. The ventilator is highly efficient in removing air and is simple and economical in construction and installation.

Briefly, the ventilator of the present invention is suitable for mounting on the roof of a building having a hole through which air may flow from the building. The ventilator includes a pair of generally trapezoidal side members having upper and lower bases and slanting ends. The side members are affixed on either side of the hole in the roof. Covering sheets extend across the ends and upper base of the side members to define an opening along the upper base having an area not less than that of the roof hole. The movement of wind over the covering sheets on the slanting ends draws air out of the hole in the roof and the opening in the ventilator.

Preferably, one end of each side member is less slanted than the other end. When the side members are affixed to a slanting roof, the less slanted ends are uphill to facilitate the movement of the wind over the uphill covering sheet.

The invention will be further understood by reference to the drawing in which.

Figure 1:
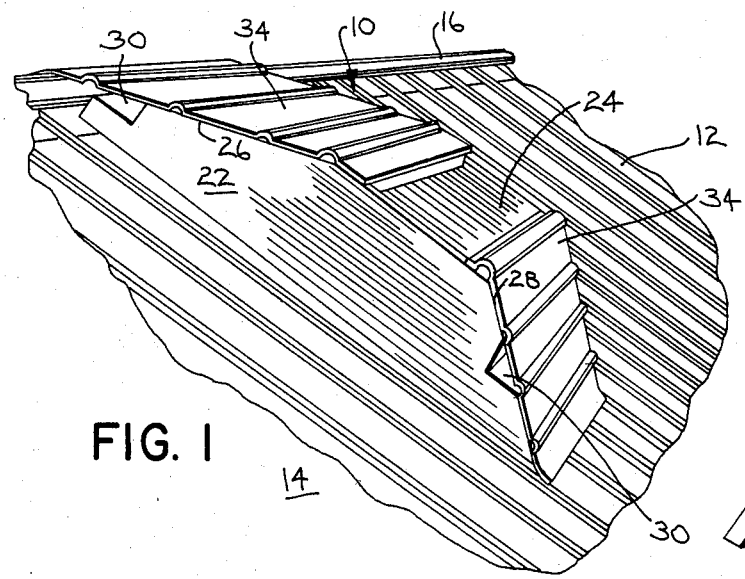
FIG. 1 is a perspective view of the improved roof ventilator of the present invention.

In FIG. 1, the improved roof ventilator of the present invention is shown by the numeral 10. Ventilator 10 is suitable for mounting on roof 12 of building 14. Roof 12 may slope and may be of the corrugated metal type. It is desirable, but not essential, to mount ventilator 10 adjacent ridge 16 since the moist air tends to collect at the peak of the roof and rain run-off problems are minimized.

Roof 12 contains hole 18. Hole 18 is typically rectangular. Roof 12 is supported by spaced purlins 20.

Ventilator 10 includes a pair of trapezium side members 22 and 24, one of which is placed on roof 12 along either side of hole 18 as by mounting the lower base of the trapezium on the roof. Side members 22 and 24 run parallel to the direction of slope of roof 12. The uphill slanting ends of members 22 and 24 are adjacent hole 18 in roof 12. The slant of uphill ends 26, with respect to the base of side members 22 and 24 mounted on the roof may be less than that of the downhill ends 28. However, the slant of uphill ends 26 is such that the ends slant upwardly toward the upper base with respect to the horizontal when side members 22 and 24 are mounted on roof 12.

Figure 3:
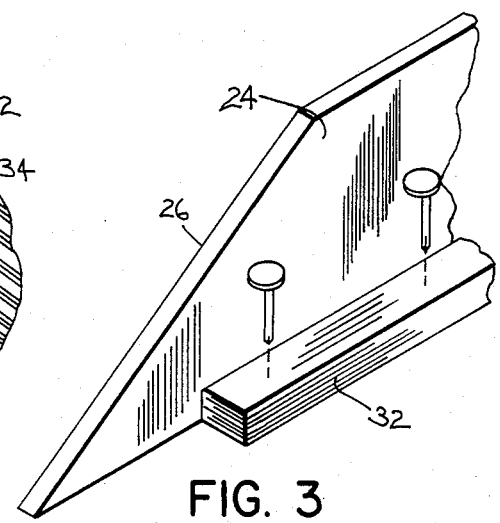
FIG. 3 is a partial detailed view showing modification of the side members of the ventilator.
Figure 2:
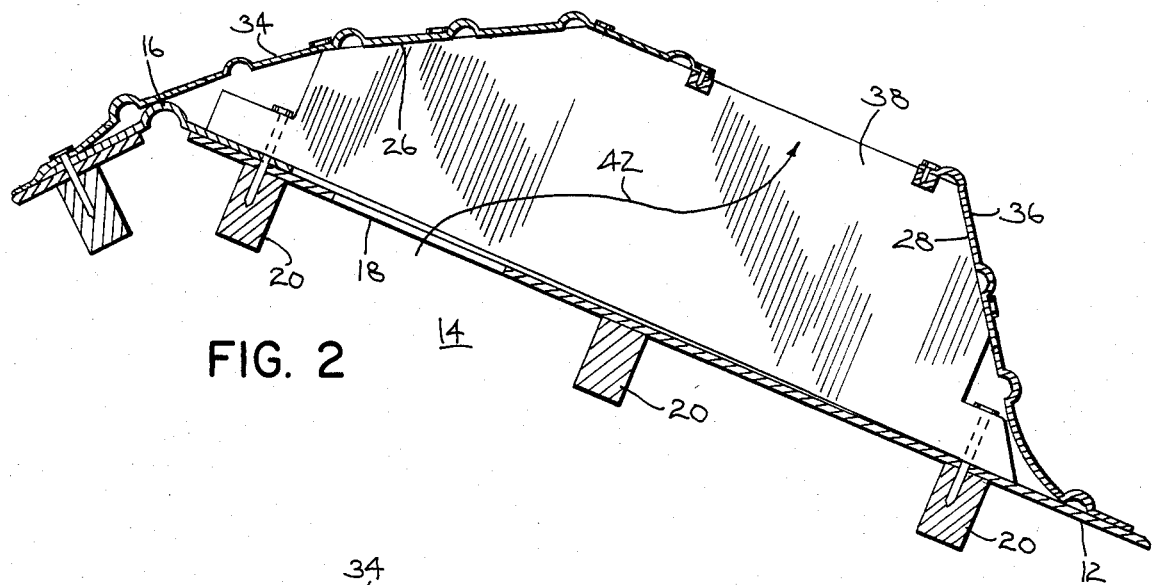
FIG. 2 is a cross-sectional view of the ventilator.

Side members 22 and 24 may be fastened to roof 12 by nailing them to purlins 20, as shown in FIG. 2 or to the rafters for roof 12. Notches 30 may be provided in ends 26 and 28 for this purpose. Or, as shown in FIG. 3, stringers 32 may be provided on side members 22 and 24 for nailing the side members to the purlins or rafters.

Sheet material, such as corrugated steel sheeting is placed across side members 22 and 24 and secured to the side members, as by nailing. Sheet 34 is placed on uphill ends 26. Sheet 34 may overlap ridge 16, if desired, to seal the vent, and to facilitate the flow of wind. Sheet 36 is placed on downhill ends 28. Sheet 36 may extend downwardly over roof 12 to seal ventilator 10 and facilitate wind flow. Sheets 34 and 36 define an opening 38 along the upper bases of side members 22 and 24 adjacent the downhill ends 28 of the side members. For this purpose, sheet 34 may extend along the upper base of side members 22 and 24, as shown in FIG. 2. Preferably, openings 18 and 38 do not overlap in the direction of slope of roof 12, as shown in FIG. 2. To obtain maximum efficiency, the area of opening 38 should be at least as great as the area of hole 18. Similarly, the passage between sides 22 and 24 should be at least as great in cross-sectional area as hole 18.

In operation, the flow of wind along either sheet 34 or sheet 36 creates a zone 40 of reduced air pressure over opening 38, due to the upward momentum of the air flow along either of the sheets. This zone of reduced pressure draws air out of building 14 in a highly effective manner along the path shown by the arrow 42. Ventilator 10 may be mounted on roof 12 with side members 22 and 24 parallel to the direction of the prevailing winds to enhance the ventilation of building 14.

In applications in which it is desired to provide a current of air along the underside of roof 12 to prevent condensation from occurring, holes may be provided in the eaves of the roof to form an air supply for ventilator 10.

The offset between hole 18 in roof 12 and opening 38 in ventilator 10 prevents snow or rain from entering building 14. Rain or snow entering ventilator 10 drains out along roof 12 beneath sheet 36. The length of side members 22 and 24 may be such as to establish an offset between hole 18 and opening 38 of any desired distance. Screens may be placed over one or both of hole 18 and opening 38 to keep out insects, birds, and animals.

Figure 4:
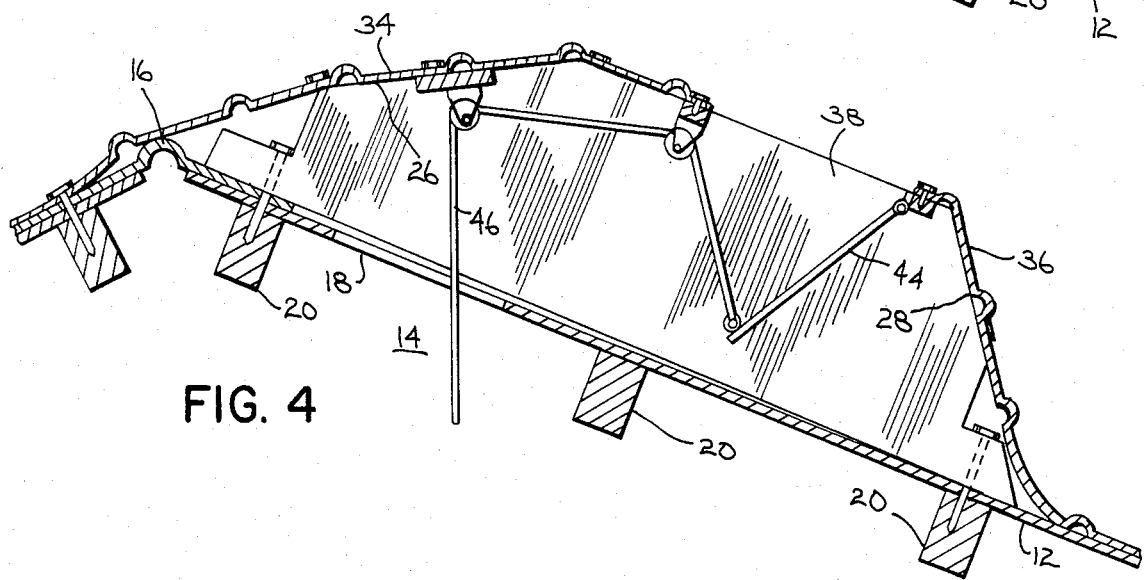
FIG. 4 is a cross-sectional view showing a modification of the ventilator.

A flap may be employed in conjunction with opening 38 or hole 18 to control the amount of ventilation provided to building 14. For example, FIG. 4 shows flap 44 operated by cable 46 that may control the size opening 38 and the amount of ventilation.

Various modes of carrying out the invention are contemplated as being within the scope of the following claims particularly pointing out and distinctly claiming the subject matter which is regarded as the invention.

I claim:

1. A ventilator for mounting on a building roof, said roof having a hole through which air may flow from the building, said ventilator comprising:

a pair of trapezoidal side members having parallel, straight upper and lower bases and having slanting ends, said side members being spaced from each other, and the lower bases of said side members being mountable on the roof on either side of the hole; and a sheet-like covering means mounted on said side members and extending across the ends and upper base of said side members to form said ventilator, said covering means having an opening along the upper bases of the side members that is flush with the plane of said sheet-like covering means, the upward movement of air along the exterior of said covering means on said slanting ends and upper base of said ventilator creating a zone of reduced pressure over said opening that draws air out of the building through the hole in the roof and said opening in said ventilator.

2. The ventilator according to claim 1 wherein one ends of said side members are less slanted with respect to said lower bases than the other ends.

3. The ventilator according to claim 1 wherein the area of said opening and the cross-sectional area of the spacing between said members is not less than the area of the hole in the roof.

4. The ventilator according to claim 1 wherein the hole in the roof is adjacent one ends of the side members and the opening formed by the covering members is adjacent the other ends of the side members.

5. The ventilator according to claim 4 wherein the ventilator is so constructed that the hole in the roof and the opening formed by the covering members do not overlap.

6. The ventilator according to claim 1 wherein said covering means are extendable across the adjacent portions of the roof.

7. The ventilator according to claim 1 further defined as suitable for mounting on a building roof that slopes downwardly in a direction extending away from a ridge line of the roof and wherein the side members are spaced normal to the ridge line of the roof for positioning one slanting end of each side member uphill on the roof and the other slanting end downhill on the roof.

8. A ventilator according to claim 1 suitable for mounting on a building roof that slopes downwardly in a direction extending away from a ridge line of the roof and wherein the side members are spaced normal to the ridge line of the roof for positioning one slanting end of said side members uphill on the roof and the other slanting end downhill on the roof, the uphill ends of said side members being less slanted with respect to the lower bases than the downhill ends.

9. The ventilator according to claim 1 including means for controlling the area of at least one of the hole or said opening.

10. The ventilator according to claim 7 wherein said ventilator is mountable adjacent the ridge of said roof and wherein the covering means adjacent the ridge overlaps the ridge.

11. The ventilator according to claim 7 wherein the slant of the uphill ends of the side members is such that the ends of the side members slant upwardly with respect to the horizontal in a direction from the lower base to the upper base when the ventilator is mounted on the roof.

* * * * *